US009346138B2

(12) United States Patent
Lechleiter

(10) Patent No.: US 9,346,138 B2
(45) Date of Patent: May 24, 2016

(54) PROGRAM-CONTROLLED MACHINE TOOL

(75) Inventor: Karl Lechleiter, Oy-Mittelberg (DE)

(73) Assignee: DECKEL MAHO PFRONTEN GMBH, Pfronten (DE)

( * ) Notice: Subject to any disclaimer, the term of this patent is extended or adjusted under 35 U.S.C. 154(b) by 308 days.

(21) Appl. No.: 13/997,066

(22) PCT Filed: Dec. 20, 2011

(86) PCT No.: PCT/EP2011/073452
§ 371 (c)(1),
(2), (4) Date: Dec. 17, 2013

(87) PCT Pub. No.: WO2012/089563
PCT Pub. Date: Jul. 5, 2012

(65) Prior Publication Data
US 2014/0105699 A1    Apr. 17, 2014

(30) Foreign Application Priority Data

Dec. 28, 2010   (DE) .......................... 10 2010 064 271

(51) Int. Cl.
*B23C 1/14* (2006.01)
*B23Q 1/01* (2006.01)
*B23Q 1/00* (2006.01)

(52) U.S. Cl.
CPC ............... *B23Q 1/01* (2013.01); *B23Q 1/0054* (2013.01); *B23Q 1/012* (2013.01); *B23Q 1/015* (2013.01); *Y10T 409/30392* (2015.01); *Y10T 409/300896* (2015.01); *Y10T 409/305824* (2015.01); *Y10T 409/308288* (2015.01); *Y10T 409/309576* (2015.01)

(58) Field of Classification Search
CPC .......... Y10T 409/309576; Y10T 409/309632; Y10T 409/307728; B23Q 1/01; B23Q 1/015; B23Q 1/017; B23Q 1/621; B23Q 1/623; B23Q 1/625; B23Q 1/626; B23Q 1/628; B23Q 2201/025; B23Q 2201/02; B23Q 2210/004; B23C 1/002; B23C 1/007
USPC ......... 409/235, 202, 185, 190, 191, 236, 165, 409/168, 134, 137; 408/67, 89
See application file for complete search history.

(56) References Cited

U.S. PATENT DOCUMENTS 5,678,291 A * 10/1997 Braun .......................... 29/26 A
6,364,582 B1   4/2002 Hoppe et al.
(Continued)

FOREIGN PATENT DOCUMENTS

DE          4242906 A1 *  6/1994
DE      202010009414 U1    12/2010
DE      102008034728 B4 *   2/2014

OTHER PUBLICATIONS

International Search Report (PCT/EP2011/073452), filed Jun. 20, 2012, in English (3 pages).

*Primary Examiner* — Sunil K Singh
*Assistant Examiner* — Nicole N Ramos
(74) *Attorney, Agent, or Firm* — The Maxham Firm

(57) ABSTRACT

A program controlled machine tool, including a bed-like substructure, a machine frame having two vertical and parallel side walls, and a compound slide having a longitudinal slide which can travel in the direction of the Y-coordinate axis on the two side walls of the machine frame. A cross slide is guided in such a way that it can travel in the direction of the X-coordinate axis. A machining unit can travel in the direction of the vertical Z-coordinate axis and has a working spindle. A workpiece table arrangement arranged on the substructure in front of the side walls. The workpiece table arrangement is arranged on the front partial area of the flat base and the cross slide has a length in the direction of the Y-coordinate axis which corresponds approximately to the diameter of the workpiece table and/or the working space in the Y-direction.

5 Claims, 2 Drawing Sheets

(56) References Cited

U.S. PATENT DOCUMENTS

| | | | |
|---|---|---|---|
| 6,682,276 B2* | 1/2004 | Harami et al. | 409/134 |
| 6,948,894 B2* | 9/2005 | Taga | B23Q 1/012 269/57 |
| 8,181,321 B2* | 5/2012 | Tullmann | 29/27 C |
| 2002/0006764 A1* | 1/2002 | Hanisch et al. | 451/1 |
| 2002/0025236 A1 | 2/2002 | Hoppe et al. | |
| 2004/0049902 A1* | 3/2004 | Hagstrom | 29/26 A |
| 2006/0270540 A1* | 11/2006 | Takayama et al. | 483/41 |
| 2010/0221082 A1 | 9/2010 | Meidar et al. | |
| 2010/0313718 A1 | 12/2010 | Meidar et al. | |

\* cited by examiner

PROGRAM-CONTROLLED MACHINE TOOL

FIELD OF INVENTION

The invention relates generally to a program controlled machine tool and more particularly to such a machine tool that has improved accessibility to the workpiece table and the working area so as to enhance the ability to load bulky and heavy workpieces on the workpiece table.

BACKGROUND OF THE INVENTION

German Utility Model registration, DE 20 2010 009 414 U1, discloses a program controlled machine tool which has a machine frame including two side walls extending in the longitudinal direction. A longitudinal slide that can travel in the Y-direction is arranged on these two side walls. A cross slide that can travel in the X-direction is arranged on the front side of the longitudinal slide. The cross slide is made as a flat and relatively wide plate. At the face side of this flat cross slide, a machining unit having a vertical spindle head can travel in the Z-direction. A workpiece table arrangement is arranged between two side walls on a fore-part which is narrower compared to the machine frame, that arrangement containing a rotary swivel table in swivel bridge design for the five-axis machining of workpieces.

Furthermore, German patent application DE 199 18 359 A1 discloses a program controlled machine tool which has a machine bed and a column arranged thereon. On the top side of this column, a cross slide can travel in the X-direction and a console is mounted in a travelling fashion on the front face side of this column as a support of a workpiece table. Below the workpiece table and the table console, the machine bed has a semi-circular front part in the fashion of a floor tray. Only three-axis machining is possible by means of this workpiece table arrangement.

Modern program controlled machine tools for machining metallic workpieces, for example, universal lathe and milling machines and machining centers, are usually designed to carry out several complex machining operations on a workpiece which is to be subjected to three-axis to five-axis machining while clamped. The program controlled five-axis machining of a workpiece increases the output of the respective machine and raises the machining accuracy thereof because reclamping operations of the workpiece, optionally intermediate storage and also positional errors occurring in reclamping, are avoided. In these machines, inter alia, a good accessibility to the workpiece table and to the working area is of essential practical significance for loading the workpiece table with heavy and bulky workpieces. Since from certain weights of several kilograms and corresponding dimensions, workpieces may no longer be placed and clamped manually but only by hoisting means, in particular by cranes, on the workpiece table, a good accessibility of the workpiece table and also of the entire working area is highly significant since the workpiece table is usually loaded with such weighty workpieces by means of cranes. Conventional universal milling machines and machining centers usually have no optimum design with regard to the accessibility of the workpiece table, because the workpiece table usually designed as a swivel rotary structure, is arranged in swiveling fashion in the space between the two side walls of the machine frame. It is not always possible without any problems to load this workpiece table with bulky workpieces by means of cranes or other lifting devices.

SUMMARY OF EMBODIMENTS OF THE INVENTION

It is a purpose of embodiments of the invention to create a program controlled machine tool which, accompanied by a small place requirement and high inherent rigidity, has good accessibility to the workpiece table and to the working area so as to also be able to load bulky and heavy workpieces on the workpiece table by means of a crane or other lifting devices.

In a generic, program controlled machine tool, this purpose is achieved by the concepts disclosed herein. On the one hand, a high inherent rigidity of the machine structure is achieved by forming the substructure as a flat base having cylindrical side and front walls and is made in an integrated design with the rear machine frame. The small height of the base enables a good accessibility to the workpiece table and to the working area from above and from at least one side. Small dimensions of the machine result, inter alia, from the fact that the workpiece table is arranged on the front partial area of the base in front of the two side walls of the machine frame. Since the cross slide, which can travel in the X-direction, has a Y-direction length which corresponds approximately to the diameter of the workpiece table in the Y-direction, a sufficiently large travel path for the cross slide is achieved in the Y-direction and the cross-slide length which is considerably enlarged with respect to conventional machines additionally supports the aspired high overall rigidity.

The development of the front part of the substructure as a flat, partially cylindrical or semi-circular base further produces an advantageously small contact area and thus relatively small dimensions to the front. In addition, an operator can be relatively close to the workpiece, in particular when it is set up, so that observation and monitoring can be conducted through the window of a cabin door, preferably made as a round door. The development of the flat base also enables a high-strength and rigid positioning of the machine frame with its side walls on the base part which is extended rearward, if necessary, so as to achieve a high overall rigidity of the basic structure of the machine. The aspired good accessibility of the workpiece table, or the working area, or both, is effected, inter alia, by the fact that the workpiece table is arranged in the direction of the Y-coordinate axis in front of the two face sides of the side walls rather than between the two side walls. Therefore, the clamping area of the table for the workpiece loading by means of lifting devices and cranes is readily accessible from above and from the side. The space for the workpiece table is not narrowed by the mutual distance of the two side walls of the machine frame since the workpiece table is disposed on the front side in front of the two side walls of the machine frame. Therefore, the workpiece table cannot be loaded from the front side alone but also from an inclined side. This is even supported since one side wall of the machine frame is shorter than the second side wall so as to facilitate the accessibility to the workpiece table from the front and also from the side of the shortened frame wall and in each case diagonally from above.

A useful embodiment of the invention is characterized by the fact that the longitudinal slide of the compound slide, which can travel on both side walls of the frame in the Y-direction, has an approximately triangular or also trapezoidal shape in a side view and carries the guides for the long cross slide which is approximately trapezoidal in the side view at the front top and bottom face side. As a result of this design of the two slides, the cross slide can be extended widely while the support maintains its high strength and close machining tolerances can be observed in this extended position of the cross slide.

For the five-axis machining of workpieces, the machine tool according to embodiments of the invention uses a workpiece table which is made as a swivel rotary table and has a downward offset support bridge between two journals which are in alignment. A round table rotatable about its orthogonal central axis is supported on the support bridge. The two journals are each supported in a bearing block and are fixed to the base in front of the front ends of the two side walls of the machine frame. The swivel and rotary table integrated in this table design can be driven by linear rotating motors, wherein one of these linear motors can be installed in the middle bridge part. The rotary table can be fixed in predetermined swivel positions in which the machining operation is carried out, for example, inclined bores are produced. However, what is called "interpolated working" is also possible where the rotary table is turned during the machining operation and is swiveled about the joint rotation axis of the journal.

In order to support the accessibility to the swivel rotary table from above and from one side, a useful embodiment of the invention is characterized by the fact that the first bearing block adjacent to the shortened side wall and the cylindrical base wall only has a bearing for the journal while the opposite second bearing block carries, in addition to the bearing for the second journal, further drive means for the swivel movements of the workpiece table and thus has correspondingly greater dimensions. A further improved accessibility to the working area is achieved by the fact that the machine frame side wall associated to the lower bearing block is shorter to the front compared to the opposite side wall.

In order to further support the aspired high overall rigidity of the machine structure, the two side walls of the frame can be connected to each other in their front area by a dimensionally rigid wall-like cross-bar which can be part of a rear wall confining a lower recess.

BRIEF DESCRIPTION OF THE DRAWING

The objects, advantages, and features of the embodiments of the invention will be more clearly perceived from the following detailed description, when read in conjunction with the accompanying drawing, in which.

DETAILED DESCRIPTION OF EMBODIMENTS OF THE INVENTION

Figure 1:
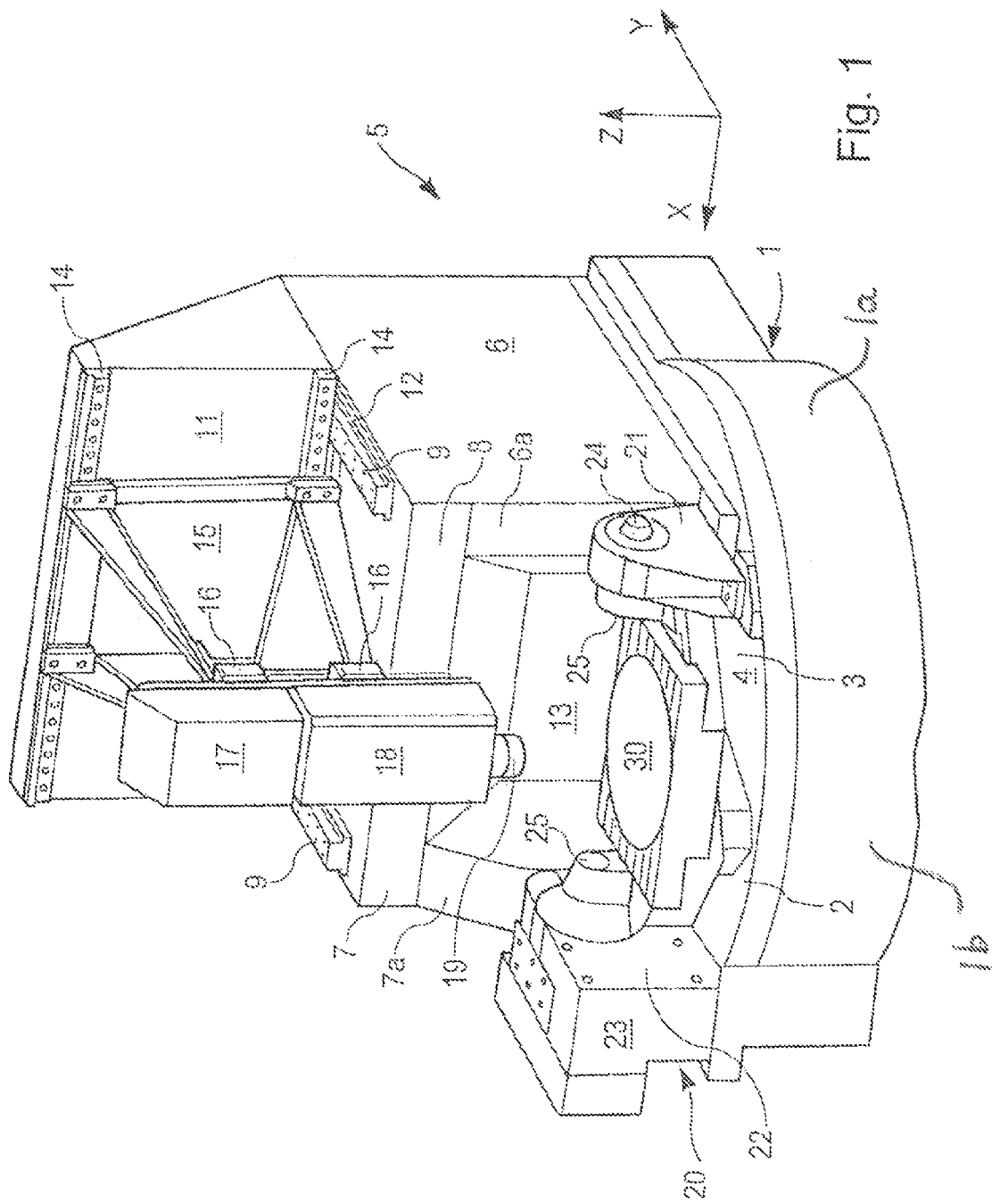
FIG. 1 shows a schematic perspective view of a design of an embodiment of a machine tool according to the invention.
Figure 2:
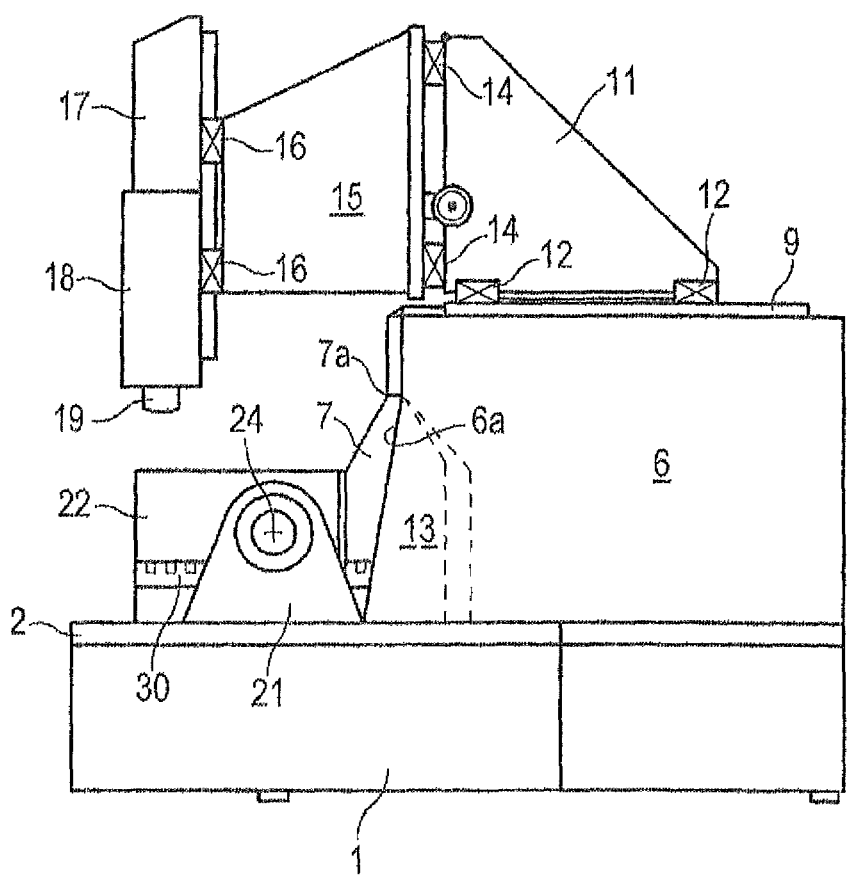
FIG. 2 is a schematic side view of the machine design according to FIG. 1, with the longitudinal slide in a forward position.

The machine tool shown in FIGS. 1 and 2 is a universal milling and drilling machine serving for machining workpieces in five axes while clamped. A flat base 1 has a partially cylindrical shape in its area pointing laterally (1*a*) and to the front (1*b*), wherein the slightly taller side wall 2 of the base encloses a clearance 4 confined by a slanted bottom. A machine frame is rigidly attached in integrated design on the rear area of the base, the frame containing two vertical side walls 6, 7 and front crossbar 8 above a rear wall. The side walls are fixed to each other and to the base, thus forming what is called a monoblock structure. The right-hand side wall 6 in FIG. 1 is shorter to the front than is left-hand side wall 7. A guiding rail 9 is mounted on each of the upper sides of side walls 6, 7, wherein a longitudinal slide 11 can travel in the direction of the Y-coordinate axis on the rails. As shown in FIG. 2, longitudinal slide 11 has a contour approximately triangular in a side view and can travel with the horizontal leg side via two guiding shoes 12 each on guiding rails 9 by means of a drive unit (not shown).

FIG. 1 shows the rear position and FIG. 2 the forward position of longitudinal slide 11. At the front face side of longitudinal slide, which is approximately triangular in the side view, two vertically spaced-apart horizontal guiding rails 14 are arranged, on which cross-slide 15, having a rear broadside, is guided in the direction of the X-coordinate axis in such a way that it can travel by means of a motor (not shown). This cross-slide 15 consists of a highly rigid plate design and has a shape which is approximately triangular in a top view, as shown in FIG. 1. The rear broadside of cross-slide 15 is supported and guided on guiding rails 14, which are vertically rather far apart from one another, by means of two guiding shoes each. A vertical slide 17, which can travel by means of a motor (not shown) in the vertical Z-axis at linear guides 16, is arranged on the front narrow side of cross-slide 15. The vertical slide carries machining unit 18 having a milling cutter with a working spindle 19.

In the Y-direction in front of side walls 6, 7 of machine frame 5 there is a workpiece table arrangement which, in the embodiment shown, is formed as what is called a swivel rotary table 20. This workpiece table arrangement has two lateral bearing blocks 21, 22, each of which is attached to bottom 3 of base 1, each via a support foot. As shown in FIG. 1, right-hand bearing block 21 is arranged in front of face side 6*a* of the right-hand shorter side wall, and left-hand bearing block 22 is arranged in front of face side 7*a* of left-hand side wall 7 of the frame. The right-hand bearing block in FIG. 1 only contains a suitable bearing for one swivel pin 24, which is arranged at a lateral flank of a bridge-like central part 25. In alignment with swivel pin or journal 24, another swivel pin (not visible in the drawing) is pivoted at the other side of central part 25 in second bearing block 22. A drive unit 23, including an electric motor and, optionally, a reduction gear is assigned to this second block 22, the dimensions of which, as shown in FIG. 1, considerably exceed the dimensions of right-hand bearing block 21.

A rotary table 30 for receiving a workpiece (not shown) is arranged on bridge-like central part 25, so that the table can be rotated via an installed drive unit, for example, a rotary linear motor, to be able to carry out an angular positioning and also continuous machining operations during a rotary movement at the workpiece. Due to the relatively small height of right-hand bearing block 21, the working area of the machine tool, which is confined by rotary table 30 in central part 25 and the movement area of the working spindle 19, is substantially more accessible from the front, from the diagonally right-hand side, and also laterally from the right-hand side, for workpiece loading and also for the monitoring, rather than from the left-hand side where the second bearing block 22 and the drive unit are located. As evident from FIGS. 1 and 2, cavity 13 is formed in the machine frame in the rear wall of the frame underneath crossbar S. The swivel rotary table 25, 30 can immerse in collision-free manner into the cavity during a swivel movement rearwardly about the rotation axis of journals 24.

Longitudinal slide 11 and cross-slide 15 form a compound slide which has an elongated shape in the Y-direction, wherein, as shown in particular in FIG. 2, the longitudinal extension of cross-slide 15 in the Y-direction corresponds approximately to the diameter of rotary table 30 on central part 25 of the table arrangement. This enables the working area to be fully spanned in the position shown in FIG. 2. In the position fully extended to the front according to FIG. 2, the front of longitudinal slide 11 is approximately above face side 6a of the shorter side wall 6 of the frame.

The present concept is not limited to the above described machine tool but also comprises variants of this machine design. For example, it is also possible to use, instead of a swivel rotary table arrangement, a simple workpiece table arrangement having a rigid workpiece table.

What is claimed is:

1. A program controlled machine tool comprising:
   a bed-like substructure;
   a machine frame on the bed-like structure, the machine frame having two vertical and spaced parallel side walls, one being a first side wall and the other being a second side wall that is shorter to the front than the first side wall, both side walls having front ends;
   a compound slide having a longitudinal slide movable in the direction of the Y-coordinate axis on the side walls of the machine frame, the compound slide also having a cross slide which is movable in the direction of the X-coordinate axis on the front side of the longitudinal slide;
   a machining unit movable in the direction of the vertical Z-coordinate axis on the cross slide by means of a vertical slide and has an integrated working spindle;
   a workpiece table arrangement, which is arranged on the substructure in front of the front ends of the side walls of the machine frame thereby defining a working area, wherein:
   the substructure is in the form of a flat base having cylindrical side and front walls and is rigidly attached to the machine frame;
   the workpiece table arrangement contains a swivel rotary table having two bearing blocks, the bearing blocks being fixed to the flat base of the bed-like substructure in front of the front ends of the side walls of the machine frame, a first of the two bearing blocks is adjacent to the shorter side wall of the machine frame and the cylindrical side wall of the base only has a bearing for one swivel pin of the swivel rotary table, and drive means for the swivel movements of the workpiece table about the common axis of the two bearing blocks being arranged at the opposite bearing block in addition to the bearing for another swivel pin;
   the workpiece table arrangement is arranged on a front partial area of the flat base;
   the cross slide having a length extending from the longitudinal side in the direction of the Y-coordinate axis which corresponds approximately to the diameter of the workpiece table or of the working area in the direction of the Y-coordinate axis; and
   the cross-slide having a trapezoidal shape in both side view and top view, and the vertical slide of the machining unit being guided on guides at a front narrow side of the cross slide.

2. The machine tool according to claim 1, wherein the cylindrical side wall of the base extends from a lateral area below a second of the two bearing blocks via the front side of the base to a lateral area below the shorter side wall.

3. The machine tool according to claim 1, wherein the two side walls of the machine frame are rigidly connected in their front area by a dimensionally rigid cross-bar above a cavity in a rear wall and have face sides inclined to the front.

4. The machine tool according to claim 1, wherein the two side walls of the machine frame are rigidly connected in their front area by a dimensionally rigid cross-bar above a cavity in a rear wall and have face sides inclined to the front.

5. The machine tool according to claim 2, wherein the two side walls of the machine frame are rigidly connected in their front area by a dimensionally rigid cross-bar above a cavity in a rear wall and have face sides inclined to the front.

* * * * *